United States Patent [19]
Rush et al.

[11] 3,889,742
[45] June 17, 1975

[54] AIR CONDITIONING APPARATUS AND METHOD

[75] Inventors: William F. Rush, Arlington Heights; Jaroslav Wurm, North Riverside; Raymond J. Dufour, Wheaton, all of Ill.

[73] Assignee: Gas Developments Corporation, Chicago, Ill.

[22] Filed: Nov. 13, 1973

[21] Appl. No.: 415,323

[52] U.S. Cl. .................. 165/7; 165/18; 165/59
[51] Int. Cl. ............................................. F23l 15/02
[58] Field of Search .................. 165/6–10, 2–3, 165/59, 86, 22, 50, 18; 126/420

[56] References Cited
UNITED STATES PATENTS

| | | | |
|---|---|---|---|
| 3,009,684 | 11/1961 | Munters | 165/7 |
| 3,125,157 | 3/1964 | Munters et al. | 165/7 |
| 3,470,708 | 10/1969 | Weil et al. | 165/7 |

Primary Examiner—Charles Sukalo
Attorney, Agent, or Firm—Thomas W. Speckman

[57] ABSTRACT

Efficiency of an open-cycle air conditioning apparatus for heating and cooling is improved and the economy of external power is increased both with respect to cost and energy consumption by providing a combination of a low temperature heater and a high temperature heater for regenerating the desiccant means in the air conditioning apparatus. The power source for the low temperature heater can utilize solar energy, waste energy, and the like. The power source for the high temperature heater, when needed, can be an open flame burner of the like. In the cooling mode of operation, the desiccant means is partially or totally regenerated by a relatively lower temperature air stream and, if necessary, regeneration may be completed by a relatively higher temperature air stream, dependent upon ambient conditions.

10 Claims, 4 Drawing Figures

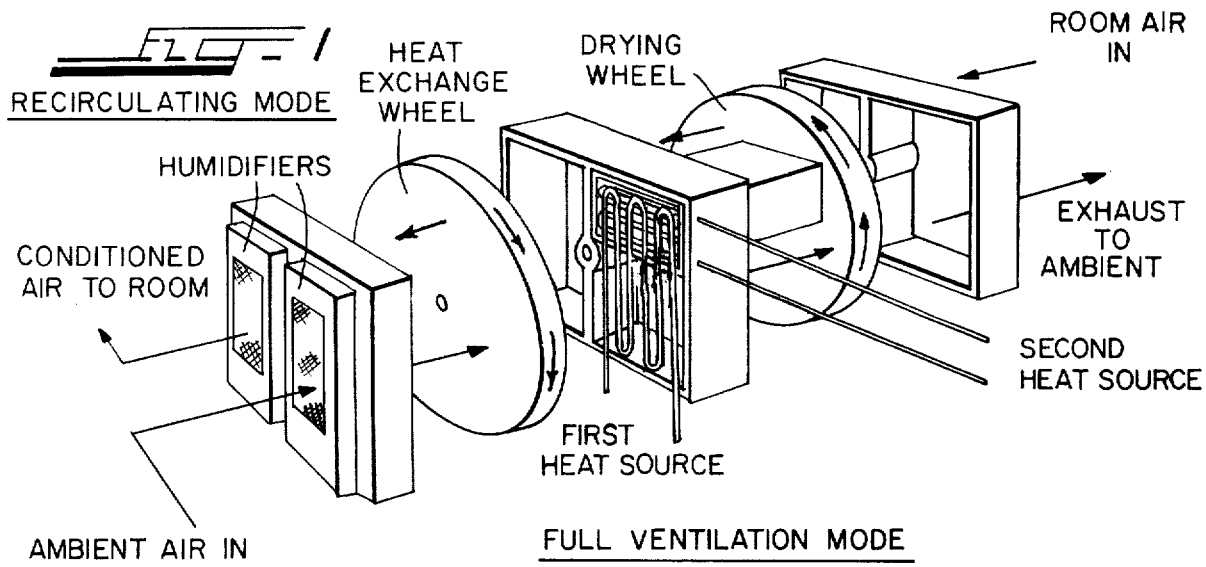
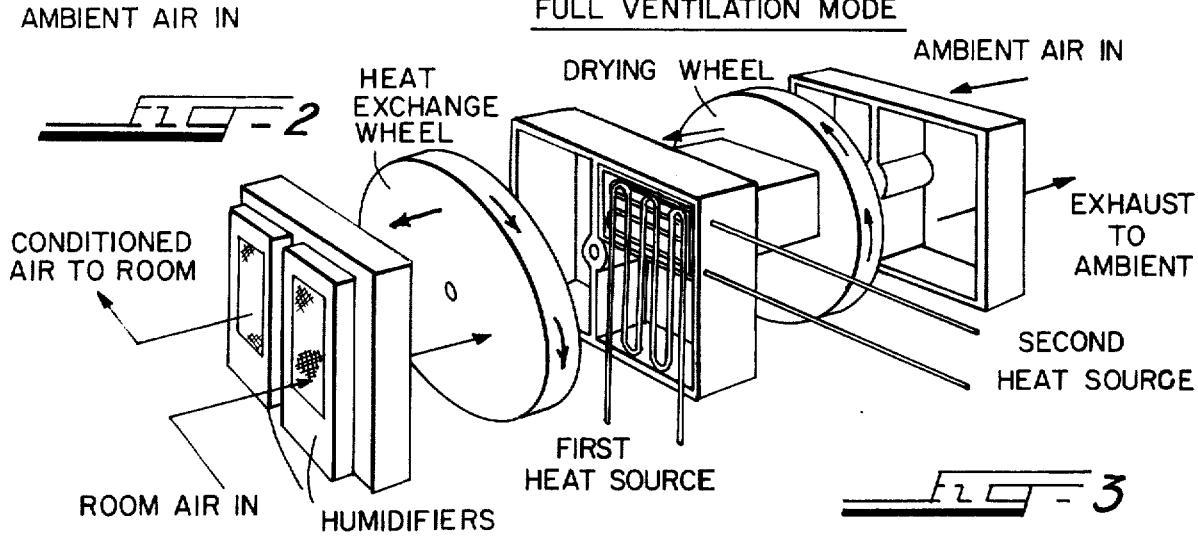
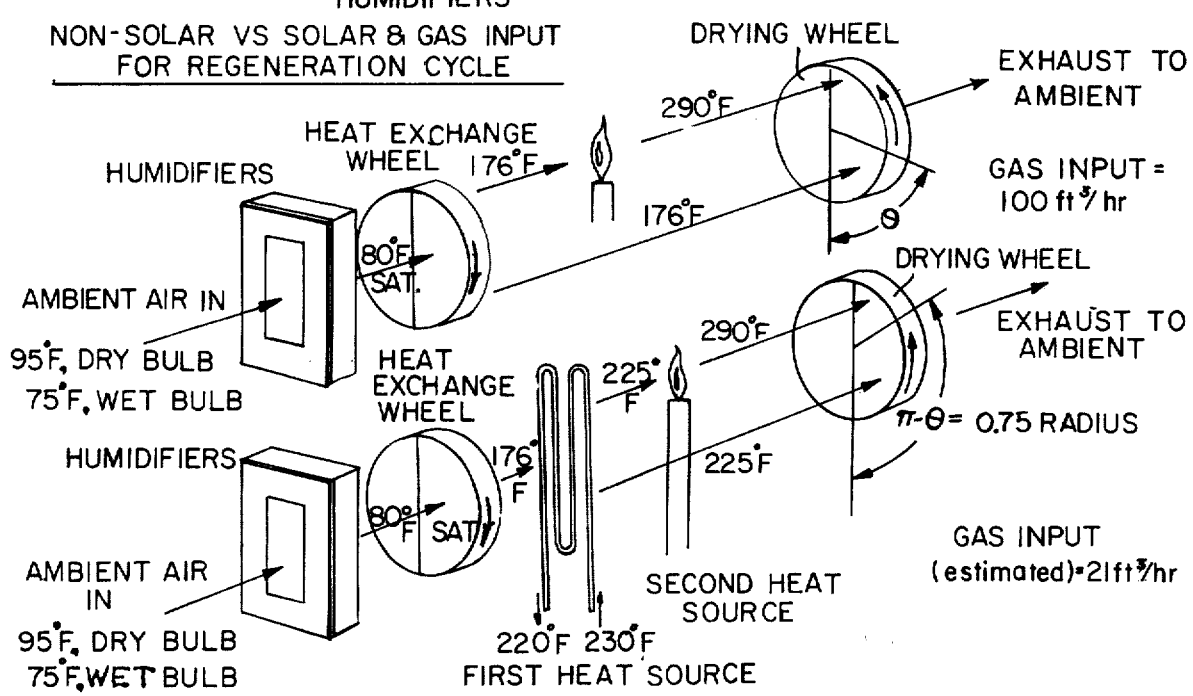

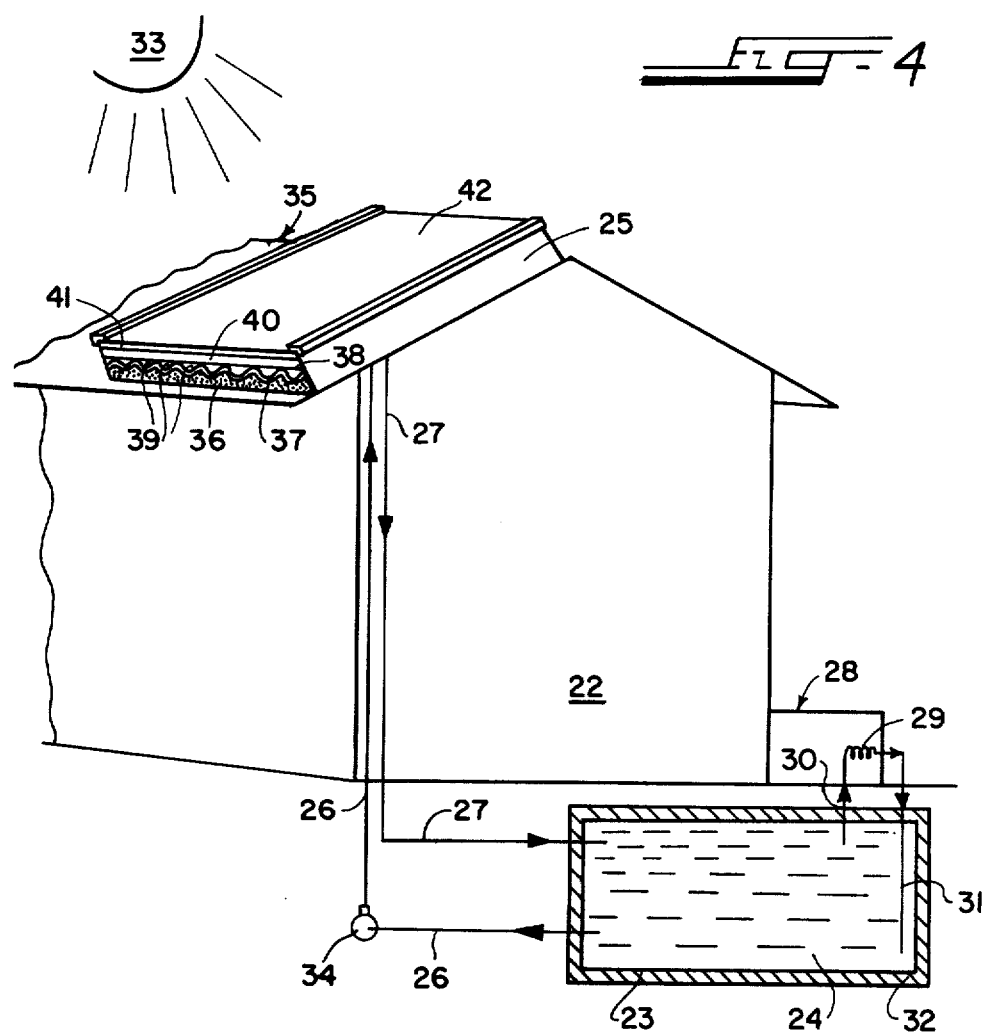

AIR CONDITIONING APPARATUS AND METHOD

This invention relates to air conditioning apparatus and methods of the open-cycle type. More particularly, this invention relates to improvements in air conditioning apparatus and method wherein moisture and heat are transferred from one air stream to another using elements which move cyclically between the air streams.

Air conditioning apparatus of the open-cycle type are generally disclosed in U.S. Pat. No. 2,723,837, Neal A. Pennington and U.S. Pat. No. 2,926,502, C. G. Munters et al., among others. In such apparatus an air stream to be conditioned passes through an air-permeable drying wheel of a hygroscopic material which absorbs moisture from the air substantially adiabatically. The dried air at an elevated temperature then flows through a rotating heat exchange mass whereby it is cooled by removal of sensible heat. The dried and cooled air is then further cooled to the desired temperature and reconstituted to a desired humidity by evaporating water therein. The hygroscopic material of the drying wheel is cyclically regenerated by a regenerative air stream.

During regeneration, regenerative air stream is first cooled by evaporative cooling and then passed through the heat exchange mass thereby cooling the latter. Thereafter, the regeneration air stream is heated by means of an external heat source to a temperature sufficiently high to regenerate the hygroscopic material of the drying wheel, passed in thermal exchange relation to the hygroscopic material, and then discharged into the atmosphere. Such regeneration means and method are disclosed in U.S. Pat. No. 3,144,901, George W. Meek.

However, utilizing the prior art apparatus a substantial and costly external heat input is necessary for proper completion of the regeneration step. The usual external heat source is an open flame natural gas burner. Especially in view of the present energy crisis it is desirable to minimize external heating requirements and/or to provide means where readily available and relatively inexpensive external energy sources can be advantageously utilized during the operation of this apparatus.

Accordingly, it is an object of this invention to provide an apparatus and process for air conditioning including cooling and heating wherein the requirements for a high temperature external heat source are lowered or eliminated.

It is a further object of this invention to provide an improved open-cycle air conditioning apparatus and method whereby relatively inexpensive, low temperature heat sources can be utilized to supply a substantial portion of the heat requirement for the regeneration of the hygroscopic material of the moisture transfer means.

Still other objects within the purview of this invention will readily present themselves to one skilled in the art upon reference to the ensuing specification and the drawings showing preferred embodiments wherein:

FIG. 1 is a schematic representation of an open-cycle air conditioning apparatus showing one embodiment of this invention in a full recirculating mode;

FIG. 2 is a schematic representation of an open-cycle air conditioning apparatus showing one embodiment of this invention in a full ventilation mode;

FIG. 3 is a schematic representation showing the comparison of an air conditioning apparatus embodying the present invention utilizing solar heat as a first heat source with open gas flame as a second heat source versus the sole use of an open gas flame as the only heat source; and FIG. 4 is a schematic representation showing use of solar heat for an apparatus of one embodiment of this invention.

The present invention is directed to an air conditioning apparatus and process which can be operated both in a cooling mode and in a heating mode. The air conditioning apparatus comprises an enclosure which defines an incoming air passageway for air to be treated and a separate regenerative air passageway, means for passing an air stream through each of these passageways, a sensible heat exchanger means within the enclosure and adapted for transfer of thermal energy from one passageway to the other passageway, and desiccant means for transfer of moisture from the air treatment passageway to the regenerative passageway spaced toward the exhaust to the ambient atmosphere of the regenerative air stream. A first evaporative cooling means is provided near the exit port of the conditioned air passageway to the room and a second evaporative cooling means is provided near the entrance port of the regenerative air passageway for use in the cooling mode.

The improvement of this invention comprises a low-temperature heater means situated in the regenerative air passageway between the sensible heat exchanger means and the desiccant means and capable of supplying heat to an air stream flowing within the regenerating air passageway in an amount frequently sufficient to vaporize moisture carried by the desiccant means into the regenerating air passageway. The heat source for the low-temperature heater means can be solar heat, waste heat recovery systems and the like. Any heat source above the temperature of the air being conditioned after exiting the heat exchange wheel is useful. In the heating mode any heat source above the temperature of the room air is useful. Additionally, a high-temperature heater means may be situated in said regenerating air passageway between the low temperature heater means and the desiccant means which is capable of raising a portion of the heated air stream to a final regeneration temperature for the desiccant when required.

In the cooling mode of the open-cycle air conditioner, four basic steps are involved: (a) adiabatic drying of a moist air stream to be conditioned by a desiccant means, (b) removal from the conditioning air stream of sensible heat resulting from the adiabatic drying step, (c) adiabatic saturation of the conditioning air stream with water to provide conditioned air having the desired temperature and humidity, and (d) regeneration of the sensible heat exchanger means and desiccant means.

The apparatus and process of this invention may be operated in the full recirculating mode wherein air from a conditioned room passes through the air treatment passageway of the apparatus and returns to the air conditioned room while ambient air from the atmosphere is passed through the regenerative passageway and exhausted to the ambient atmosphere. The apparatus and process of this invention may also be operated in the full ventilation mode wherein ambient air from the atmosphere is conditioned for introduction to the room to be conditioned and exhaust air from the conditioned room is utilized as the regenerative air and exhausted to ambient atmosphere. Combinations of the recirculating and ventilation mode may also be utilized. For operation of the apparatus and process in the cooling mode, it is preferred to utilize the recirculating mode of operation while for operation in the heating mode it is preferred to use the ventilating mode of operation. The cooling mode can also be operated under the full ventilating mode or a combination or ventilating and recirculating modes, while the heating mode can be operated at less efficiency under the full recirculating or combination of ventilating and recirculating modes.

For use as a cooling air conditioner, FIG. 1 schematically shows the apparatus of this invention in the full recirculating mode. The regenerative air stream is ambient atmospheric air below 120°F. dry bulb and below 95°F. wet bulb. The regenerative air stream enters the apparatus through a humidifier adding moisture to the stream up to the saturation point for the purpose of cooling the incoming air. The moisture saturated regenerative stream is then passed through a heat exchange wheel and heated to about 150° to 200°F. average, under general cooling air conditioning conditions. The heat exchange wheel rotates in the direction shown at from about 2 to about 12 revolutions per minute, about 5 to about 7rpm being preferred under general cooling conditions. The full regenerative air stream from the heat exchange wheel is passed through the first heat source which may advantageously be at any temperature above the temperature of the regenerative air stream leaving the heat exchange wheel. Therefore, many economical sources are suitable for the first heat source, including heat from solar sources, boiler heat, waste process heat, and the like. After passage through the first heat source, the regererative air stream is split into two portions, the first portion passing directly through the drying wheel and the second portion passing through a second heat source prior to passage through the drying wheel. The second heat source is at a higher temperature than the first heat source and provides sufficient heat to the second portion of the regenerative stream to regenerate the drying wheel. The final regeneration temperature of the drying wheel is that sufficient to drive off essentially all of the absorbed water of the desiccant on the drying wheel, usually greater than 212°F. and preferably in the order of 212° to 400°F.

The drying wheel rotates in the direction shown at about 1/10 to ½ revolution per minute, preferably about ¼ to 1/6 revolution per minute. The first portion of the regenerative air stream passing through the drying wheel raises the temperature of the desiccant and depending upon its temperature, may drive off adsorbed water, while the second regenerative air stream is of sufficient volume, governed by the angle of exposure of the drying wheel, to regenerate the desiccant at a satisfactory temperature. The regenerative air, after passing through the drying wheel, is exhausted to the ambient atmosphere.

The air stream to be treated, as shown in FIG. 1, is room air, which is adiabatically dried by the drying wheel, passes through the heat exchange wheel where a major portion of the sensible heat is removed, followed by adiabatic saturation with water by a humidifier to provide conditioned air having desired temperature and humidity.

FIG. 2 shows a cooling apparatus and process of this invention in the full ventilation mode. The apparatus of FIG. 2 is the same as that of FIG. 1. In the process shown in FIG. 2, the regenerative cycle input is conditioned room air which, after serving as the regenerative stream, is exhausted to the ambient atmosphere and the input for the air stream to be conditioned is from the ambient atmosphere. Otherwise, the operating conditions are similar to the operation of the apparatus of FIG. 1 with differing temperature and humidity conditions.

By way of example of use of the cooling apparatus of this invention in a full recirculating mode, as shown in FIG. 1, an air stream from the conditioned room enters the apparatus at 80°F. dry bulb and 67°F. wet bulb (standard American Refrigeration Institute conditions), passes through the drying wheel where it is dried to less than about 0.003 pounds of water per pound of air, raising it in temperature to about 148°F. The treatment stream then passes through the heat exchange wheel wherein it is cooled to about 76°F. and is further cooled by evaporative cooling by passing through a humidifying device and exits from the apparatus to the room at about 56.5°F dry bulb and about 53°F. wet bulb. Countercurrently with the treatment stream passage, regeneration takes place in the regenerative air passageway where a countercurrent stream is taken from the ambient atmosphere, as shown in the regeneration cycle shown in FIG. 3. All of the air flows are at the rate of 56.1 pounds per minute and the Coefficient of Performance is calculated to be 0.73.

FIG. 3 shows that for the open-cycle air conditioners operated in the cooling mode prior to this invention, under the above conditions, a gas input of 100 cubic feet per hour was required. Utilizing a first heat source of 230°F., the gas input requirement for the second heat source is reduced to a total gas input (estimated) of 21 cubic feet per hour, almost one-fifth of the former gas input requirement. The first heat source raises the temperature of the preheated sector of the drying wheel in FIG. 3 to a temperature sufficiently high to accomplish, frequently, a major portion of the regeneration. This reduces the sector of the drying wheel through which the air heated by the second heat source passes. Utilization of the apparatus of this invention under full ventilation mode, as shown in FIG. 2, reduces the Coefficient of Performance to about 0.16 to about 0.3, dependent upon ambient temperature conditions and room exhaust temperature conditions. For these reasons, it is preferred to use the recirculating mode as diagramatically shown in FIG. 1 when the apparatus is used to cool air, but combination of the recirculating and ventilation mode may be desirable to provide fresh air to the conditioned room, even though a lower Coefficient of Performance is obtained.

With regard to the construction of the various elements of the air conditioning apparatus embodying the present invention, the drying wheel is preferably a rotating wheel made of a corrugated asbestos sheet and impregnated with a hygroscopic substance such a lithium chloride, silica gel, crystalline aluminosilicates (molecular sieves), and similar substances. The corrugated sheet is then wrapped around a mandrel and wound into wheel shape to form a disc comprising a plurality of parallel channels which permit rapid drying of an air stream flowing therethrough and regeneration.

Typical lithium chloride desiccant wheels are disclosed in U.S. Pat. No. 2,700,537, Neal A. Pennington.

A particularly preferred desiccant wheel, having an amount of desiccant on the support of up to about 90 percent, comprises sheets or layers of a fibrous material such as asbestos impregnated with about 25 to about 90 percent by weight of finely-divided crystalline alkali metal or alkaline earth metal aluminosilicates having a pore size of about 3 Angstroms to about 13 Angstroms. Asbestos can be impregnated with the aluminosilicates by forming an aqueous slurry of asbestos fibers and the desired amount of an aluminosilicate, depositing the slurry on a continuously moving screen, and then drying the slurry while on the screen so as to form a thin sheet which is rolled to form a wheel in a manner hereinabove set forth. Such aluminosilicate wheels have been found to reduce the moisture of the air stream to less than 0.003 pounds of water per pound of air under the most rigorous conditions of temperature and humidity found in the United States. The use of aluminosilicate wheels is more fully described in U.S. patent application Ser. No. 314,000, Improved Desiccant System for an Open-Cycle Air Conditioning System, Robert A. Marcriss, et al.

The heat exchange wheel is preferably a wheel of substantially the same diameter as the desiccant wheel. The heat exchanger wheel can be made of expanded aluminum honeycomb, aluminum foil, or the like, which permits the passage of an air stream with very little pressure drop thereacross yet which presents a large heat exchange area.

The evaporative cooling means may be pads made from cooling tower fill such as corrugated paper sheets impregnated with a suitable bactericide, e.g., phenolic resin. The pads are positioned vertically and water from a reservoir pan situated below the pads is recirculated thereover. As the water runs down the pad by gravity, an air stream passes in a tortuous path through the pad and becomes humidified.

The first heater or low-temperature heater means may be a heat-exchange coil through which a suitable heat transfer fluid is circulated. The external heat source for raising the heat transfer fluid to a desired temperature can be solar heat, waste heat from another unrelated operation, heat generated by a nuclear reactor, electrically generated heat, or the like.

The second heater or high-temperature heater means conveniently can be an open flame burner or it can be another heat exchange coil within which a heat transfer fluid is circulated at a relatively high temperature so that the portion of air stream passing over this heat exchange coil can be heated to the necessary final regeneration temperature.

Not shown in the figures is a suitable fan means to move both the treatment air stream and the regenerative air stream through the apparatus.

Baffle means, preferably adjustable, are necessary to conduct the second high temperature portion of the regenerative air stream through the second heat source and to the necessary sector of the drying wheel.

The present invention is very well suited for use in combination with a solar heat source which provides heat input to the low-temperature heater means. A particularly preferred air conditioning system embodying the present invention and utilizing solar heat is illustrated in FIG. 4. Enclosed space such as home 22 is provided with solar energy storage tank 23 containing heat transfer fluid 24, solar energy collector means 25 and conduits 26 and 27 which provide communication between collector means 25 and tank 23. Home 22 is heated or cooled, as desired, by air conditioning apparatus 28 which is of the general type shown in FIG. 1. Heater means in open-cycle air conditioning apparatus 28 comprises heat exchange coil 29 (equivalent to first heat source in FIGS. 1 and 2) through which heat transfer fluid 24, e.g., water, water-ethylene glycol mixtures, or the like, is circulated via conduits 30 and 31. Heat loss from tank 23 is minimized by means of insulating layer 32 which surrounds tank 23. In operation of this solar energy recovery system radiant solar heat from source 33, the sun, is utilized to raise the temperature of heat transfer liquid 24 in tank 23. Liquid 24 is circulated by means of pump 34 via conduit 26 from tank 23 up to and through solar collector means 25 situated on roof 35, and then returned to tank 23 at a relatively higher temperature. Pump 34 is operated only during times at which the solar transfer fluid in the collector means 25 is at a temperature higher than the temperature of the heat transfer liquid 24 at the upper portion of tank 23. For operating the low-temperature heater means of air conditioning apparatus 28, relatively hotter heat transfer fluid is withdrawn from tank 23 via conduit 30 at an upper level and relatively colder heat transfer fluid is returned to tank 23 via conduit 31 or a lower level thereof.

Solar energy collectors suitable for use in the system embodying the present invention can be of two general types: (1) concentrating type, or (2) non-concentrating type.

The concentrating type solar energy collector is capable of developing higher temperature by concentrating the radiation emanating from the sun and to achieve a relatively higher collector efficiency by using a smaller heat absorption area with attendant smaller heat losses. However, the concentrating type of collector must use the direct component of sunlight, thus there can be no heat collection on cloudy days. Moreover, the mirrors and/or lenses that follow the direct component of sunlight are guided by a relatively complex and costly tracking system.

The non-concentrating solar collectors collect both the direct and the diffuse components of sunlight, and are operable on cloudy or overcast days as well. They are less costly and no tracking systems are required. Nevertheless, heat transfer liquid temperatures as high as about 230°F. are readily achievable, which temperatures are sufficiently high for the present purposes. A suitable non-concentrating solar collector is shown in FIG. 4.

Collector 25 comprises insulated base 36 on which is placed a sandwich comprising corrugated aluminum plate 3 and flat aluminum plate 38, together defining a plurality of passageways 39 through which a heat transfer fluid is circulated. The exposed face 40 of plate 39 may be coated with a selective coating which reduces infrared emission from the collector surface. Spaced transparent cover sheets 41 and 42 are situated over exposed face 40 to reduce convective heat losses as well as to provide protection from the elements, windblown debris, and the like. A polyvinyl fluoride film, glass or the like, reinforced with a wire or fabric mesh is suitable for this purpose.

Any type of solar collector which will raise the temperature of the heat transfer fluid to over about 180° to 200°F. is suitable for use in this invention. Likewise, any other heat sources which can provide such temperatures are suitable, such as waste heat from any boiler or chemical process source.

The apparatus and process of this invention can also be operated in a heating mode, providing higher heating efficiency than a conventional gas-fired furnace. In a typical heating mode, the heat exchange wheel is stationary and the rotational speed of the drying wheel is increased to about 2 to about 12 rpm, preferably about 5 to about 7 rpm. At the increased rotational speed this wheel behaves as an enthalpy exchanger, exchanging heat and moisture. The air stream, previously characterized as "treatment air stream" in FIG. 2 heats ambient air by passing through the drying wheel, now functioning as an enthalpy exchanger, sufficiently for discharge as conditioned air to the room. The room air provides the regeneration air stream and is heated by the first heat source, and if necessary, by the second heat source to a temperature sufficient to regenerate and to provide heat to the enthalpy exchanger. A major portion of the sensible heat imparted to the enthalpy exchanger is removed by the incoming treatment air stream which passes through the heated and regenerated portion of the enthalpy exchanger wheel. In addition, moisture removal from the incoming air stream by the desiccant further raises its temperature. The net effect is that the air stream exhausted from the regeneration air passageway to the ambient atmosphere is at a temperature only about 20°F. higher than ambient. Thus, air stream enthalpy that is being discarded is substantially less than that wasted in the conventional gas-fired furnace where flue gases usually have a temperature of about 400°F. to about 500°F.

An example of the apparatus shown in FIG. 2 in the heating mode is the supplying of conditioned air at about 55 pounds per minute at a temperature of about 163°F., when the ambient temperature is 0°F. and 70,000 BTU/hr. must be supplied to the conditioned volume at a steady state. Room air at about 75°F. is supplied to the regeneration air passageway and heat transfer liquid at about 230°F. from a solar energy storage tank is circulated through the first heat source at 69.5 pounds per minute, leaving the coil at about 220°F. The regeneration air stream passing over the first heat source is heated to about 128°F. and further heated by a open flame gas burner used as the second heat source at about 179°F. and then passed through the enthalpy exchanger rotating at about 5 rpm. The heat input to the second heat source, the gas burner, is about 673 BTU/min. The exhaust air leaving the regeneration air passageway to the ambient atmosphere is at about 16°F. The enthalpy exchanger revolves and the incoming treatment air stream at about 0°F. passes through the enthalpy exchanger both heating the stream and drying the stream adiabatically, the combination raising the temperature of the treatment stream to about 163°F. for discharge to the conditioned room. Thus, with a direct fossil fuel net input of 673 BTU/min., a heat input to the conditioned room of 1,167 BTU/min. can be achieved. By contrast, a gas furnace operating at conventional 70 percent efficiency requires about 1,667 BTU/min. fossil fuel consumption to provide the conditioned room air input of 1,167 BTU/min.

The solar heat source as shown in FIG. 4 may also be used to preheat the cold air or cold water return to conventional hot air or hot water heating systems. In this case, the coil 29 shown in FIG. 4 is placed in the cold air return plenum or water pipe and preheats the return air or water prior to its entry to the furnace, thus, reducing the load on the burner of the furnace. In cases of collection of solar energy by flat collectors, the fuel requirements of the furnace burner may be reduced by as much as 50 percent resulting in a substantial savings of fossil fuels.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An open-cycle air conditioning apparatus for heating and cooling comprising:
    an enclosure defining a treatment air passageway and a separate regenerative air passageway;
    means for passing an air stream through each of said passageways;
    a sensible heat exchanger means for transfer of thermal energy from one of said passageways to the other;
    a desiccant means for transfer of moisture from the air treatment passageway to the regenerative air passageway and spaced toward the exhaust of the regenerative air stream from said heat exchanger means;
    a first evaporative cooling means near the exit of the conditioned air passageway and a second evaporative cooling means near the entrance of the regenerative air passageway;
    a low-temperature heater means in the regenerative air passageway between said sensible heat exchanger means and said desiccant means supplying heat to the entire regenerative air stream;
    a high-temperature heater means in the regenerative air passageway between said low-temperature heater means and said desiccant means supplying regeneration heat to a portion of the regenerative air stream; and
    a baffling means defining a passageway for said portion of the regenerative air stream through said high-temperature heater means and said desiccant means.

2. The apparatus of claim 1 wherein the regenerative air stream enters as ambient atmosphere air below about 120°F. dry bulb and about 95°F. wet bulb.

3. The apparatus of claim 1 wherein said sensible heat exchanger is a wheel which rotates at from about 2 to about 12 rpm.

4. The apparatus of claim 3 wherein said heat exchanger wheel rotates at about 5 to about 7 rpm.

5. The apparatus of claim 1 wherein said desiccant means is a drying wheel rotating at about 1/10 to ½ rpm.

6. The apparatus of claim 5 wherein said desiccant means is a drying wheel rotating at about ¼ to 1/6 rpm.

7. The apparatus of claim 1 wherein said low-temperature heater means is a heat exchange coil through which a heat transfer fluid is circulated.

8. The apparatus of claim 7 wherein said heat transfer fluid is heated by a source selected from solar sources, waste boiler heat, waste process heat and nuclear reactor heat.

9. The apparatus of claim 8 wherein a solar energy collector means heats said heat transfer fluid and said heat transfer fluid is stored in a solar energy storage tank, said tank providing hotter fluid in its upper portion for delivery to said low-temperature heater means and return of said heat transfer fluid from said low-temperature heater means to the bottom cooler portion of said solar energy storage tank.

10. The apparatus of claim 9 wherein the flow of said heat transfer fluid from said solar energy collector means to said solar energy storage tank is controlled by a pump means operated only during times at which the solar energy collector means is at a temperature higher than the temperature of the heat transfer liquid in the upper portion of the solar energy storage tank.

* * * * *